United States Patent [19]

Hiramatsu

[11] Patent Number: 5,180,901
[45] Date of Patent: Jan. 19, 1993

[54] IC CARD WITH INDIVIDUAL AUTHENTICATION FUNCTION

[75] Inventor: Kenichi Hiramatsu, Kawasaki, Japan

[73] Assignee: Kabushiki Kaisha Toshiba, Kawasaki, Japan

[21] Appl. No.: 680,899

[22] Filed: Apr. 5, 1991

[30] Foreign Application Priority Data

May 21, 1990 [JP] Japan .................................. 2-130897

[51] Int. Cl.⁵ ........................ G06K 5/00; G06K 19/06
[52] U.S. Cl. ................................... 235/380; 235/382; 235/487; 235/492; 340/825.34
[58] Field of Search ............... 235/380, 382, 492, 487, 235/494; 382/58, 2, 4, 5; 340/425.34; 40/625

[56] References Cited

U.S. PATENT DOCUMENTS

| 3,576,537 | 4/1971 | Ernst ................... | 235/380 |
| 4,582,985 | 4/1986 | Lofberg ............... | 235/380 |
| 4,805,223 | 2/1989 | Denyer ................. | 382/4 |
| 5,053,608 | 10/1991 | Senanayake .......... | 235/380 |

FOREIGN PATENT DOCUMENTS 61-276081 12/1986 Japan .
62-102360 5/1987 Japan .
63-62082 3/1988 Japan .
63-68990 3/1988 Japan .................................. 235/380
63-163589 7/1988 Japan .
2-118790 5/1990 Japan .................................. 235/380
2-173868 7/1990 Japan .
2-173869 7/1990 Japan .

Primary Examiner—Eugene R. LaRoche
Assistant Examiner—Tan Nguyen
Attorney, Agent, or Firm—Cushman, Darby & Cushman

[57] ABSTRACT

A pressure sensor for inputting finger characteristic data and an authenticity sensor for detecting whether a finger is authentic are arranged on the surface of an IC card. A finger can be placed on the pressure sensor and the authenticity sensor at the same time. Finger characteristic data is input by the pressure sensor. A controller calculates a sum signal from the input finger characteristic data, and collates the calculated sum signal with a reference sum signal of an owner of the card stored in a dictionary memory. An authenticity detecting circuit inputs data from the authenticity sensor, and detects whether a finger is authentic. If the finger is authentic and if a coincidence is determined between the calculated and reference sum signals, the use of the IC card is permitted.

16 Claims, 9 Drawing Sheets

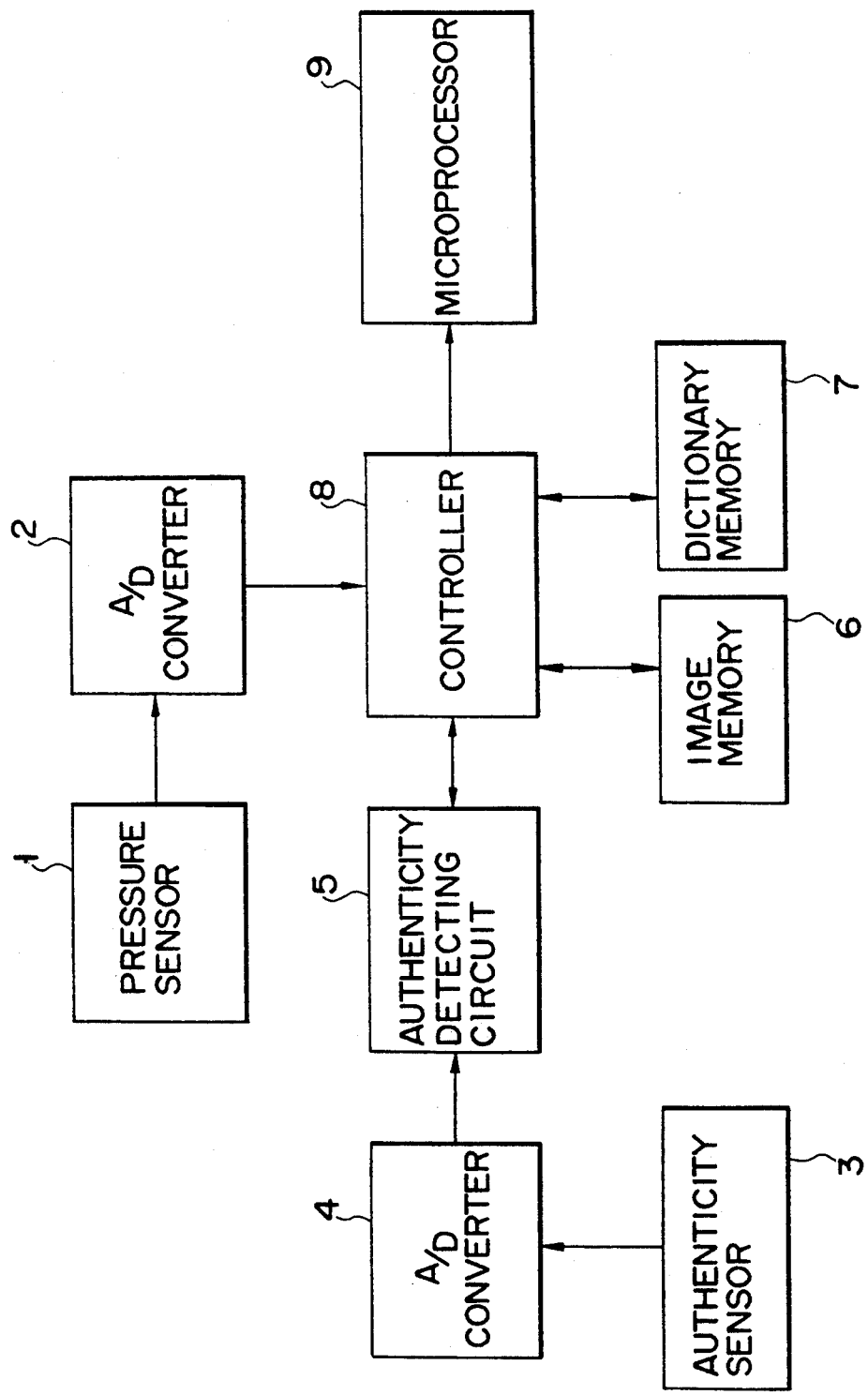
F I G. 3

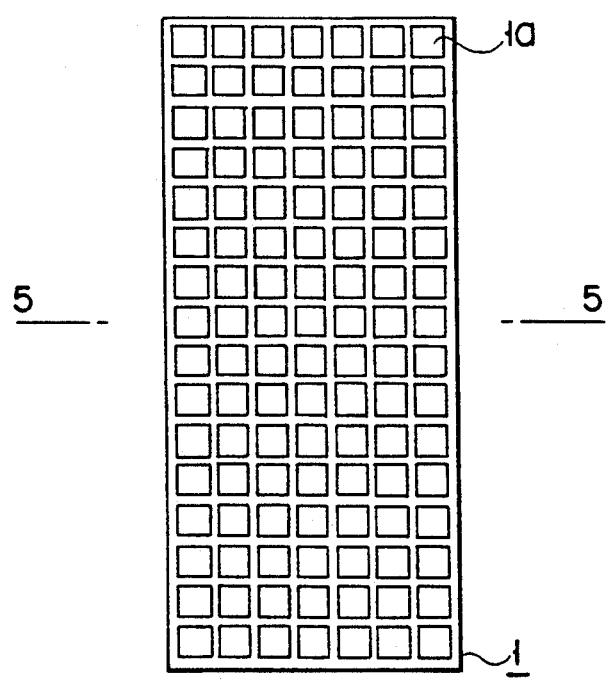
F I G. 4
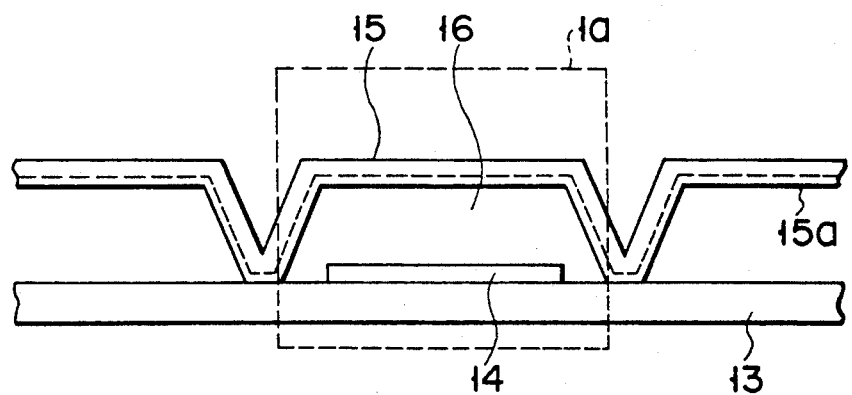
F I G. 5

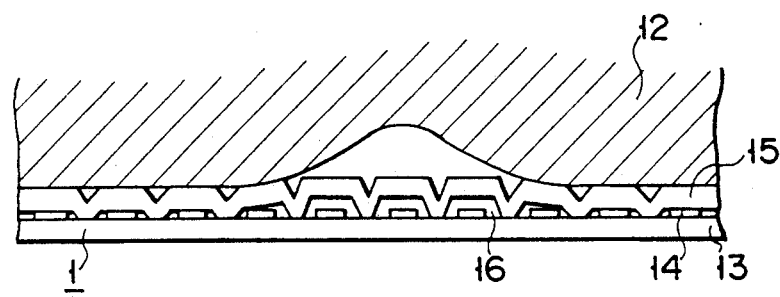
F I G. 6
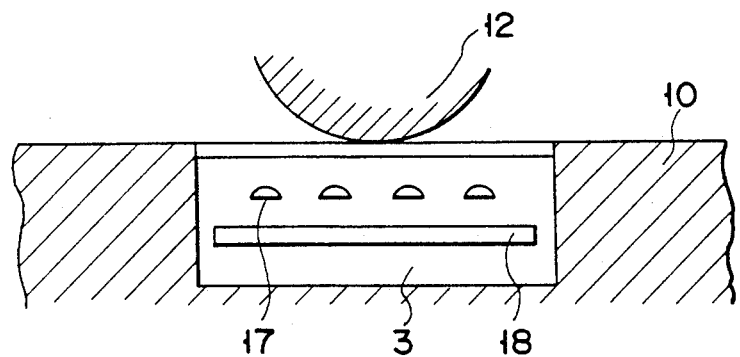
F I G. 7
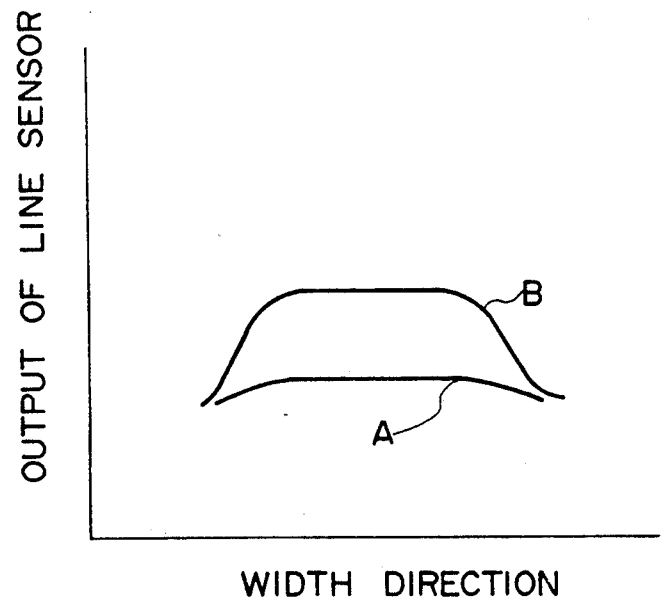
F I G. 8

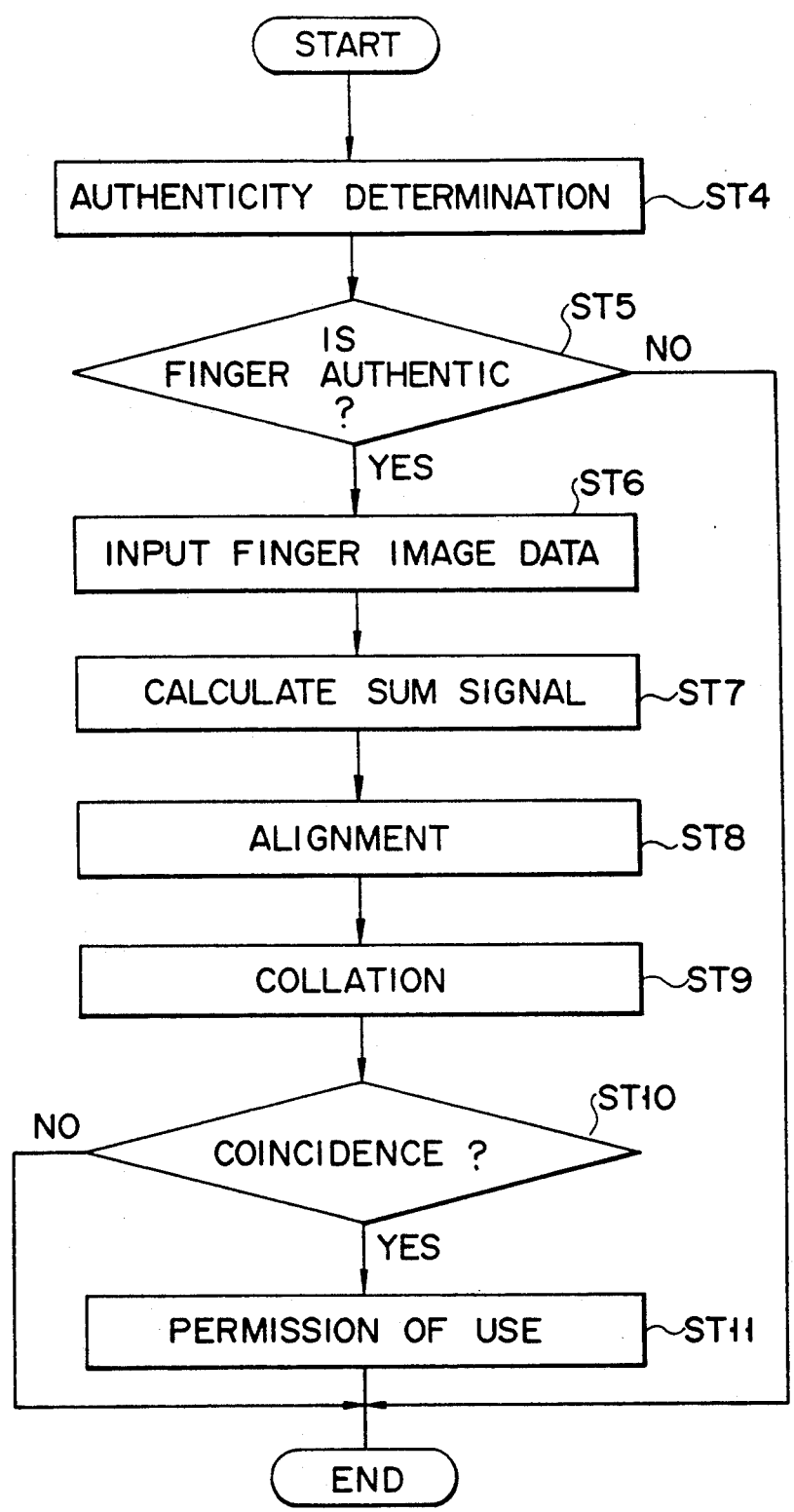
F I G. 11

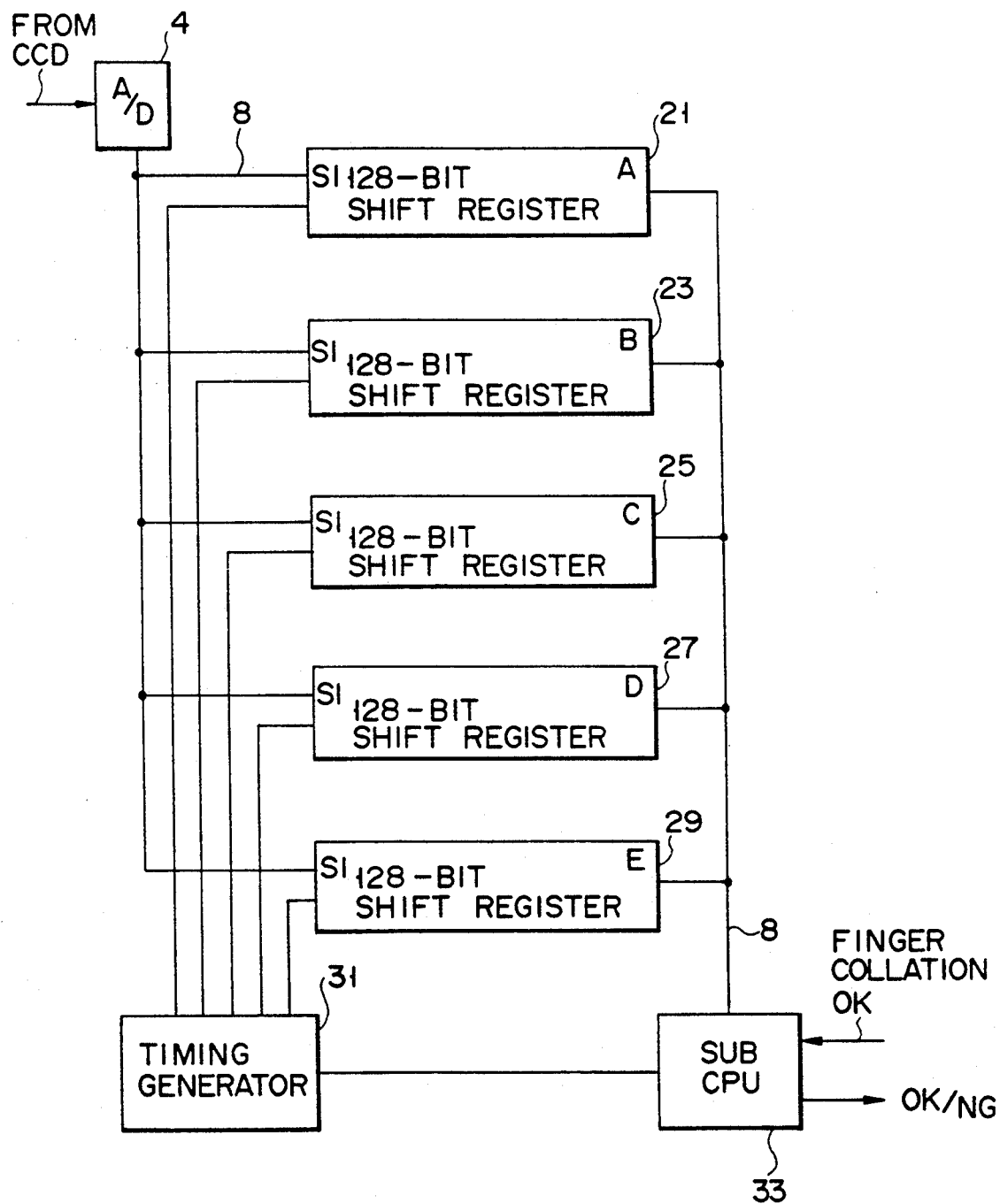
F I G. 13

NO FINGERS PLACED ON CARD
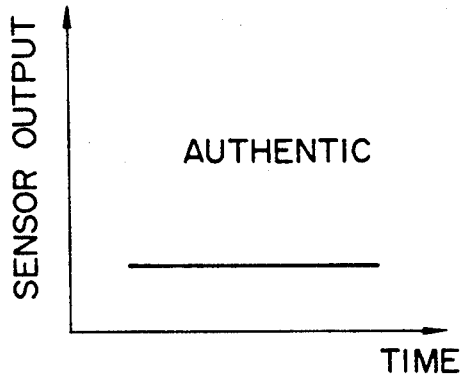
F I G. 14A
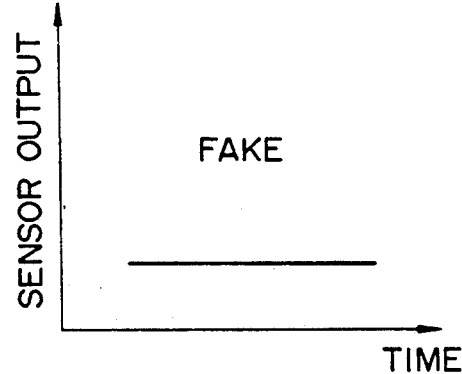
F I G. 14B
A FINGER TOUCHING CARD
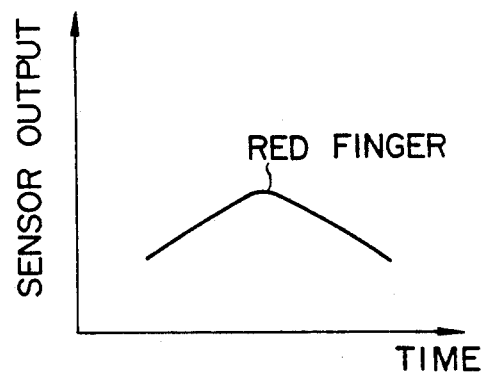
F I G. 15A
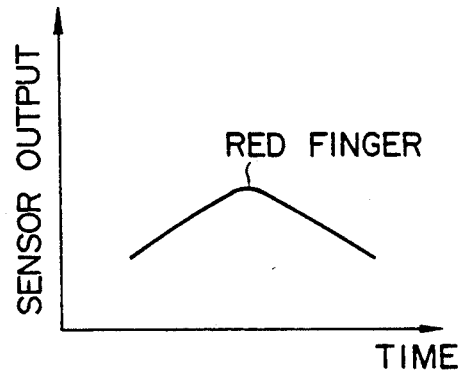
F I G. 15B
A FINGER PRESSING CARD
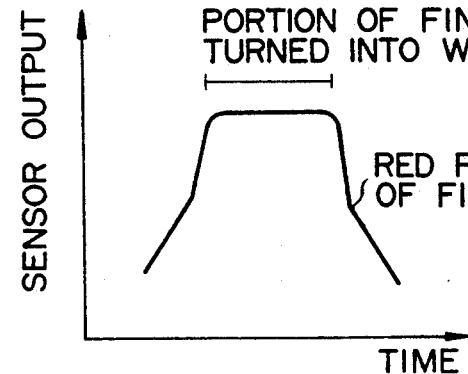
F I G. 16A
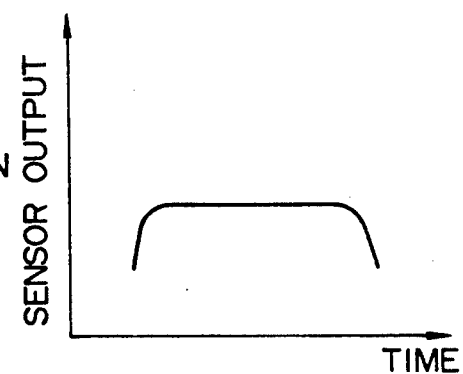
F I G. 16B

IC CARD WITH INDIVIDUAL AUTHENTICATION FUNCTION

BACKGROUND OF THE INVENTION

1. Field of the Invention

The present invention relates to an IC card having an individual authentication function for authenticating whether a user of a card is a registered owner of the card.

2. Description of the Related Art

Recently, as the use of credit cards or bank cards has been rapidly increased, an increase in illegal use of these cards has become a big problem. This illegal use of cards includes the use of a card lost by its user by a third party, e.g., a person who finds it or the use of a forged card. To prevent such an illegal use of cards, it must be confirmed that a card is authentic or a user of a card is its owner.

As a conventional means for authenticating that a card is not a forged one or a user of a card is its legal owner, a password is generally used. For example, passwords of bank cards are stored in a central computing system of a bank connected to its ATM terminals through communication lines, thereby preventing an illegal use of the cards. In this case, however, when a legal user inserts a bank card into a card reader of an ATM terminal and inputs his or her password, this password can be read by third parties by a signal transmitted through communication lines. Therefore, an illegal use of cards by third parties cannot be perfectly prevented.

When an IC card is used as a bank card, on the other hand, since a password input using a terminal is internally authenticated by the card, it is impossible to read the password by a signal transmitted through communication lines. Also, when an IC card called a multifunctional IC card having a key input function and a data display function is used, a password is directly input in the card and internally authenticated by the card. Therefore, an illegal use of cards by third parties can be effectively, perfectly prevented.

Since, however, a number of four or more digits is generally used as a password, an owner of a card often forgets his or her own password. In this case, therefore, even a legal user of a card cannot use the card. In contrast, if an owner of a card designates a number which is easy to remember, e.g., his or her birth date or telephone number as a password, since this password can be easily guessed by third parties, an illegal use of the card by third parties cannot be prevented.

As a method of solving the above problems, there is a method of using physical characteristics of a user of a card instead of a password. That is, a certain physical characteristic of an owner of a card is registered beforehand, and a physical characteristic of a user of the card is checked and compared with the registered physical characteristic every time the card is used, thereby authenticating whether this user of the card is its legal user. Therefore, the owner of the card need not remember a password, and an illegal use of the card can be prevented.

To prevent an illegal use of cards of this type by third parties, a series of processing tasks from inputting of a physical characteristic to authentication must be executed by an integrated circuit incorporated in a card for the following reason. For example, such a physical characteristic is input from an external system to a card and subjected to signal processing or authentication by an internal IC of the card. Since a signal corresponding to the physical characteristic must be transmitted from the external system to the card, there is a possibility that this signal is read by third parties.

Published Unexamined Japanese Patent Application No. 63-163589 discloses an IC card with a fingerprint input device. This IC card with a fingerprint input device includes a solid-state image pickup device capable of inputting fingerprint data through a transparent film formed on the surface of the card. However, this device optically detects fingerprint data of a finger, if no water (sweat) is present between a finger and the transparent film, a contact state between the finger and the transparent film becomes worse, and it is difficult to correctly detect fingerprint data of the finger.

SUMMARY OF THE INVENTION

It is an object of the present invention to provide an IC card with an individual authentication function, which can perform a series of processing tasks from inputting of a physical characteristic of an owner of a card to authentication using an integrated circuit incorporated in the card, thereby preventing forgery or misuse of the card.

According to the first aspect of the present invention, an IC card with an individual authentication function comprises: an IC card main body including memory means storing finger characteristic data of a card owner; pressure sensor means, provided on one surface of the IC card main body, for inputting, as pressure, finger characteristic data; collating means for collating the finger characteristic data input from the pressure sensor means with the finger characteristic data of the card owner stored in the memory means; and control means for permitting the use of the IC card main body on the basis of the collation result of the collating means.

According to the second aspect of the present invention, an IC card comprises: an IC card main body including memory means storing finger characteristic data of a card owner; pressure sensor means, provided on one surface of the IC card main body, for inputting finger characteristic data; collating means for collating the finger characteristic data input from the pressure sensor means with the finger characteristic data of the card owner stored in the memory means; control means for permitting the use of the IC card main body on the basis of the collation result of the collating means; determining means for determining authenticity of the finger; and limiting means for limiting the use of the IC card main body on the basis of a collation result of said collating means and the determination result of the determining means.

According to the present invention, finger characteristic data is input using the pressure sensor. This finger characteristic data of a user of a card input by the pressure sensor is collated with finger characteristic data of a owner of the card stored beforehand in the card. The use of this IC card is permitted on the basis of the collation result.

In addition, to detect whether a finger is authentic (i.e., to distinguish an authentic finger from a fake one, e.g., a finger consisting of silicone rubber), the finger authenticity detecting circuit is also provided. Upon being pressed against something, an authentic finger changes its color from red to white. Therefore, when green light is radiated on the finger, the light is reflected. However, since a silicone rubber finger remains red even when it is pressed against something, very light if any green light is reflected. The authenticity of a finger is determined using this property. (For example, even if a fake finger is made of white silicone rubber, it is possible to determine that the finger is fake because its color remains unchanged before and after application of a pressure.)

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block diagram showing in detail the IC card with an individual authentication function shown in FIG. 1;

FIG. 4 is a top view schematically showing an outer appearance of a pressure sensor;

FIG. 5 is a schematic sectional view showing a part of the pressure sensor taken along a line 5—5 in FIG. 4;

FIG. 6 is an enlarged schematic sectional view showing a state in that a finger is placed on the pressure sensor;

FIG. 7 is a sectional view schematically showing a practical example of an authenticity sensor;

FIG. 8 is graph showing an example of an output distribution of a line sensor input to an authenticity detecting circuit when a finger is authentic;

FIG. 11 is a flow chart showing collation processing for executing collation between input finger characteristic data of a user of a card and registered finger characteristic data of an owner of the card;

FIG. 13 is a block diagram showing in detail the authenticity detecting circuit 5 shown in FIG. 3;

FIGS. 14A and 14B are graphs each showing characteristics of an output from the authenticity sensor obtained when an authentic finger or a fake finger is not placed on a card;

FIGS. 15A and 15B are graphs showing characteristics of outputs from the authenticity sensor obtained when authentic and fake fingers are touched on the card, respectively; and FIGS. 16A and 16B are graphs showing characteristics of outputs from the authentic sensor obtained when the authentic and fake fingers are pressed onto the card, respectively.

DETAILED DESCRIPTION OF THE PREFERRED EMBODIMENTS

An embodiment of the present invention will be described in detail below with reference to the accompanying drawings.

Figure 1:
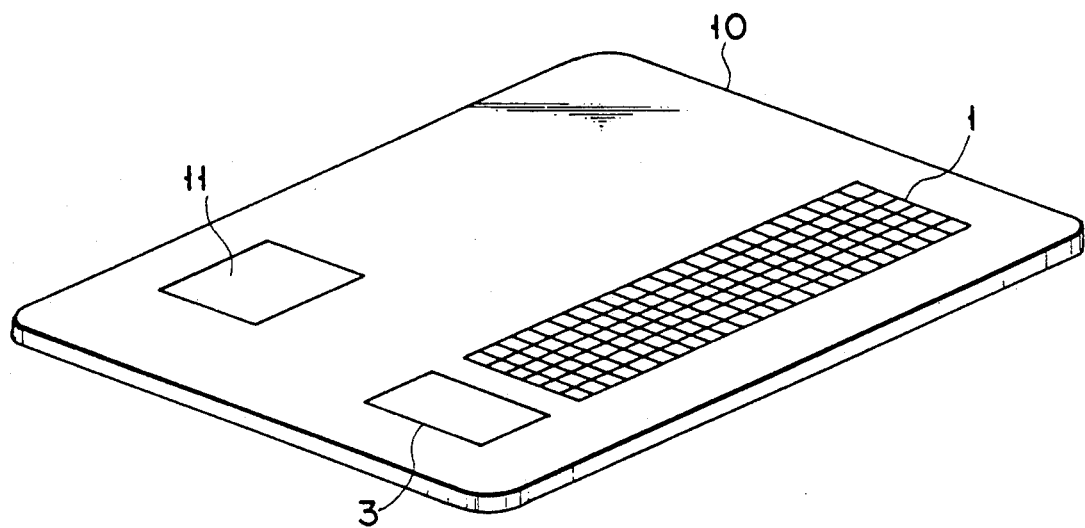
FIG. 1 is a perspective view schematically showing an outer appearance of an IC card with an individual authentication function according to the present invention.

FIG. 1 is a perspective view showing an outer appearance of an embodiment of an IC card with an individual authentication function according to the present invention. As shown in FIG. 1, this IC card with an individual authentication function of the present invention comprises a card main body 10, a pressure sensor 1, an authenticity sensor 3 for detecting whether a finger is authentic, and an external connection contact 11 to be connected to an external system.

Figure 2:
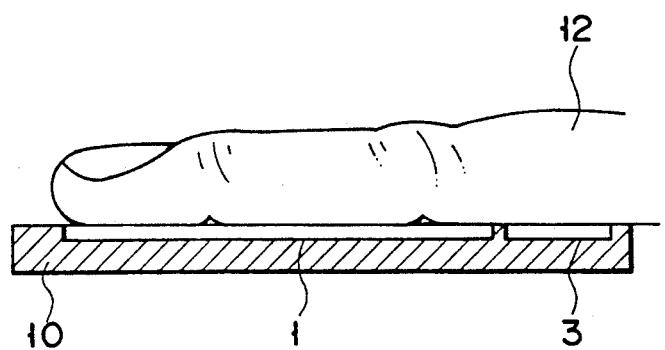
FIG. 2 is a schematic side view showing a state where a finger is placed on a pressure sensor or an authenticity sensor in order to perform authentication using the IC card with an individual authentication function shown in FIG. 1.

FIG. 2 is a schematic side view showing a finger 12 placed on the pressure sensor 1 and the authenticity sensor 3 in order to perform authentication using the IC card with an individual authentication function shown in FIG. 1. As shown in FIG. 2, the pressure sensor 1 and the authenticity sensor 3 are arranged such that a finger can be placed on the pressure and authenticity sensors 1 and 3 at the same time. Further, the pressure sensor 1 has a length for inputting finger characteristic data including at least two joints of the finger.

Whether the use of a card is legal is authenticated while a finger 12 is placed on the pressure and authenticity sensors 1 and 3, as shown in FIG. 2. If the use of a card is determined to be legal, the card is set in a usable state. If the use of a card is determined to be illegal, the card is not set in a usable state but remains in the same unusable state. When the IC card with an individual authentication function according to the present invention is used, this unusable state of the card cannot be externally determined.

If this card is a bank card, however, when a user inserts the card in a card reader of an ATM terminal to use the card, the ATM terminal receiving the card executes normal operation commands if the card is usable, and the user therefore can determine that the card is in a usable state. If the ATM terminal displays that the card is not authenticated, the user can determine that the card is not set in a usable state. Note that a device for indicating whether a card is in a usable state may be mounted on the card.

FIG. 3 is a block diagram showing an electric circuit system for executing a series of processing tasks from inputting of a finger characteristic to authentication of the IC card with an individual authentication function according to the present invention.

Referring to FIG. 3, finger pressure data (analog signal) output from the pressure sensor 1 is converted to a digital signal by an analog/digital (A/D) converter 2 and supplied to a controller 8. Finger authenticity data (analog signal) output from the authenticity sensor 3 is converted to a digital signal by an A/D converter 4 and supplied to an authenticity detecting circuit 5. The circuit 5 generates a signal indicating whether a finger is authentic, i.e., whether a finger is of a living human being or is a replica and supplies the signal to the controller 8. An image memory 6 is connected to the controller 8 and temporarily stores the data indicating the finger characteristic of a card user obtained from the output signal of the A/D converter 2. A dictionary memory 7 is connected to the controller 8 and stores data indicating a finger characteristic of a card owner. The controller 8 is constituted by, e.g., a digital signal processor (DSP) and processes the output signal from the A/D converter 2 to output the data indicating the finger characteristic of a card user to the image memory 6. In addition, the controller 8 collates this data with the data stored in the dictionary memory 7 to check whether the two finger characteristic data coincide with each other. The controller 8 also receives the signal indicating whether a finger is authentic. If a finger is authentic and the finger characteristic indicated by the data stored in the image memory 6 coincides with that indicated by the data stored in the dictionary memory 7, the controller 8 determines that the use of the card is legal and outputs a signal for permitting the use of the card to a microprocessor 9 for controlling the entire IC card.

A method of recognizing a finger characteristic using the pressure sensor 1 will be described in detail below.

FIG. 4 is a top view schematically showing an outer appearance of the pressure sensor 1. As shown in FIG. 4, the pressure sensor 1 is constituted by microsensors 1a arranged in a matrix manner.

FIG. 5 is a schematic sectional view showing a part of the pressure sensor taken along a line 5—5 in FIG. 4. Referring to FIG. 5, an electrode 14 is formed on a glass substrate 13. A silicon substrate 15 is also formed on the glass substrate 13. A diaphragm 16 is formed between the glass and silicon substrates 13 and 15. The diaphragm 16 can be formed by, e.g., an anisotropic etching technique. The silicon substrate 15 has a low-resistance layer 15a as an electrode on the side of the glass substrate 13. This layer 15a is applied with a potential which is uniform to the individual microsensors 1a from a power source (not shown). The electrode 14 is externally extracted from each of the microsensors 1a.

FIG. 6 is an enlarged schematic sectional view showing a finger placed on the pressure sensor 1 having the above arrangement. In FIG. 6, the same reference numerals as in FIG. 5 denote the same parts. When a finger is placed on the pressure sensor 1, undulations on the surface of the finger derived from joints of the finger or the like cause a variation in pressure applied on the individual microsensors 1a. In the microsensor 1a applied with a pressure higher than a predetermined value, the low-resistance layer 15a and the electrode 14 are brought into contact with each other to have the same potential. In the microsensor 1a applied with a pressure lower than the predetermined value, the low-resistance layer 15a and the electrode 14 are not brought into contact with each other, and no voltage is applied to the electrode 14. By individually detecting the potential of the electrode 14 of each microsensor 1a, image data corresponding to the undulations on the skin of the finger can be obtained.

A method of recognizing whether a finger is authentic using the authenticity sensor 3 will be described below.

FIG. 7 is a sectional view schematically showing a practical arrangement of the authentic sensor 3. As shown in FIG. 7, the authentic sensor 3 comprises green light-emitting diodes (LED) 17 arranged in a line and a line sensor 18 arranged to receive light emitted from the LEDs 17 and reflected by the finger 12. This line sensor 18 is arranged such that its longitudinal direction is set parallel to the width direction of the finger. An output signal from the line sensor 18 is converted to a digital signal by the A/D converter 4 and supplied to the authentic detecting circuit 5.

FIG. 8 is a graph showing an example of an output distribution of the line sensor 18 input to the authenticity detecting circuit 5 when a finger is authentic. Referring to FIG. 8, a curve A indicates an output distribution of the line sensor 18 obtained before a finger is placed on the authenticity sensor 3; and a curve B, an output distribution obtained when a finger is placed on the sensor 3. As shown in FIG. 8, when a finger placed on the authenticity sensor 3 is authentic, the green light is reflected by the finger, and the output distribution as indicated by the curve B is obtained. When a finger placed on the sensor 3 is fake, e.g., a fake finger made of silicone rubber, very little if any of the green light is reflected, and the output distribution indicated by the curve A remains unchanged.

The authenticity sensor 3 and the authenticity detecting circuit 5 will be described in detail below.

Figure 12:
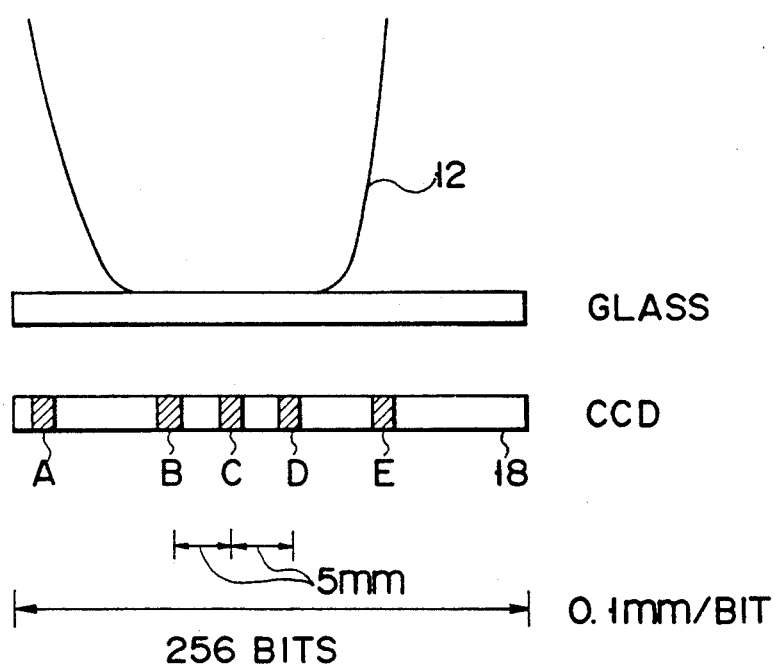
FIG. 12 is a view showing in detail the authenticity sensor 3 shown in FIG. 7.

FIG. 12 is a view showing the authenticity sensor 3 in detail. Note that in FIGS. 12 and 13, the same reference numerals as in FIGS. 3 and 7 denote the same parts and a detailed description thereof will be omitted. As shown in FIG. 12, the line sensor 18 is constituted by charge coupled devices (CCDs) and receives light reflected by the surface of the finger 12 at five points (A, B, C, D, and E) arranged in the width direction of the finger. Output values from the CCDs at the points A, B, C, D, and E are converted to digital signals by the A/D converter 4 and supplied to the authenticity detecting circuit 5.

As shown in FIG. 13, the authenticity detecting circuit 5 comprises shift registers 21, 23, 25, 27, and 29 for storing the CCD outputs from the points A, B, C, D, and E, respectively, and a timing generator 31 for supplying shift clock signals for sequentially storing the outputs from the A/D converter into the shift registers 21, 23, 25, 27, and 29 to the registers 21, 23, 25, 27, and 29. On the basis of the CCD output values stored in the shift registers 21, 23, 25, 27, and 29, a sub CPU 33 determines the authenticity of the finger 12. Each of the registers 21, 23, 25, 27, and 29 is constituted by a 128-bit shift register and stores the CCD output value from a corresponding one of the points A, B, C, D, and E as 8-bit digital data. In response to the shift clock signal from the timing generator 31, the shift register 21 sequentially stores the CCD output value at the point A for ten and several seconds. Similarly, in response to the shift clock signals from the timing generator 31, the shift registers 23, 25, 27, and 29 sequentially store the CCD output values at the points B, C, D, and E, respectively, for ten and several seconds. This time duration of "ten and several seconds" is determined on the basis of an empirical rule that collation of the finger 12 would be completed within ten and several seconds. When the sub CPU 33 receives data indicating "finger collation OK" supplied from the controller 8, it causes the timing generator 31 to stop supplying the shift clock signals, thereby stopping input to the respective shift registers. Subsequently, the sub CPU 33 controls the generator 31 to supply the shift clock signals, for a read out operation, to the shift registers 21, 23, 25, 27, and 29. One bit from each shift register, and checks whether output characteristics as shown in FIG. 15A are obtained as the output characteristics of the CCDs. FIG. 14A shows output characteristics of the CCDs (line sensor) obtained when a finger is an authentic, one and is not placed on the upper portion of the CCDs. FIG. 14B shows output characteristics obtained when a finger is a fake one, and is not placed on the upper portion of the CCDs. In this state, no difference is found between the two characteristics, as shown in FIGS. 14A and 14B. FIGS. 15A and 15B show output characteristics of the CCDs obtained when the authentic and fake fingers are touched on the card, respectively. In this state, it is assumed that a reflection value is highest at the central portion of the finger 12 regardless of whether the finger is authentic or fake. For this reason, the sub CPU 33 checks whether the respective output values at the points A, B, C, D, and D satisfy the following condition:

C>B>A

C>D>E    Condition 1

If the sub CPU 33 determines that the above Condition 1 is satisfied, it reads out the contents of the shift registers 21, 23, 25, 27, and 29, i.e., the CCD outputs obtained when the finger is pressed onto the card. If the finger is an authentic one, the color of a portion of the finger 12 pressed onto the glass turns to white to increase a reflection ratio of the green light, and increase the CCD output value. Therefore, it is presumed that the CCD output characteristics as shown in FIG. 15A are obtained. If the finger is a fake one, no portion of the finger turns to white, even when the finger is pressed onto the glass and the CCD output characteristics as shown in FIG. 16B are obtained. Therefore, the sub CPU 33 checks whether the CCD characteristics change from those shown in FIG. 15A to those shown in FIG. 16A as time elapses (Condition 2).

When the sub CPU 33 completely reads out the data of 128 bits from each shift register, it checks whether the CCD output value at each of the points A, B, C, D, and E satisfies the following condition:

B≈C≈D>A, E    (Condition 3)

If all of the above Conditions (1) through (3) are satisfied, the sub CPU 33 determines that the finger is authentic and outputs information indicating this determination to the controller 8.

A sequence of processing for authenticating whether the use of a card is legal will be described below. This authentication processing is roughly classified into "registration" and "collation".

Figure 9:
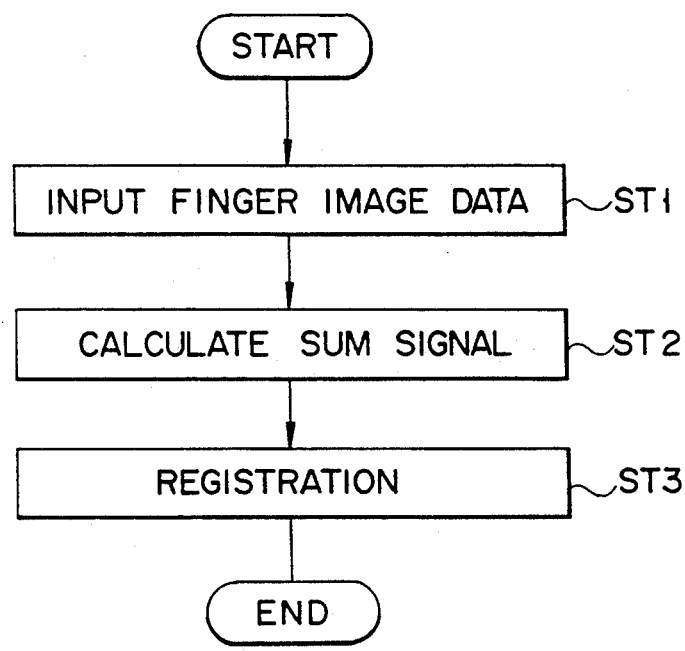
FIG. 9 is a flow chart showing processing for registering characteristic data of a finger of a card owner.
Figure 10:
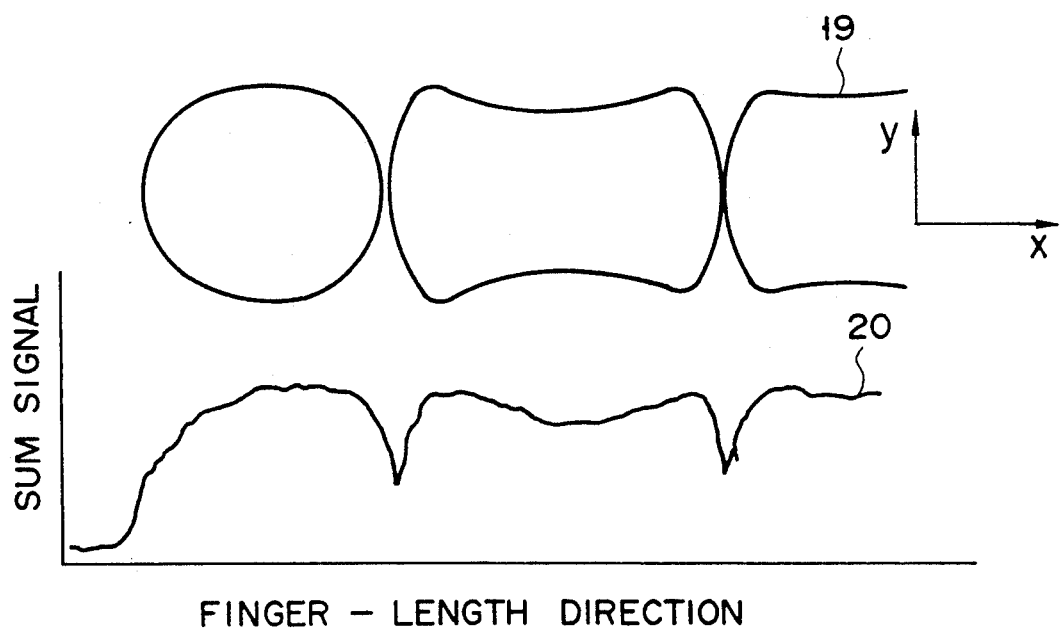
FIG. 10 is a view showing extraction of a sum signal obtained by adding densities of pixels of image data with respect to the width direction of a finger.

First, a sequence of processing executed when finger characteristic data of an owner of a card is to be registered will be described below. FIG. 9 is a flow chart showing an operation sequence of the controller 8 for this processing. First, image data corresponding to undulations of the skin of a finger is input as described above (step ST1). Subsequently, the densities of individual pixels of the image data are added with respect to the width direction of the finger (a direction perpendicular to a length direction of the finger) to calculate a sum signal (step ST2). FIG. 10 is a diagram for explaining this sum signal. FIG. 10 shows image data 19 and a sum signal 20 of the finger as a model. The sum signal 20 is a one-dimensional signal obtained by adding the densities (output values from the individual elements of the pressure sensor 1) of the individual pixels of the image data 19 of the finger. This sum signal 20 has sharp troughs in positions of lateral wrinkles corresponding to joints of the finger, and an individuality (parameter indicating the characteristic of the finger) is included in these troughs. Finally, the sum signal 20 is registered in the dictionary memory 7 (step ST3).

A processing sequence for inputting finger characteristic data of a user of the card and collating this data with the finger characteristic data of the owner of the card will be described below. FIG. 11 is a flow chart showing an operation sequence of the controller 8 for this processing.

First, as described above, the controller 8 checks whether the finger is authentic by using the authenticity sensor 3 (step ST4). If the finger is not an authentic one, the controller 8 determines that the use of the card is illegal (step ST5) and ends the processing. If the finger is an authentic one, the controller 8 inputs image data of the finger (step ST6) and calculates a sum signal (step ST7) as in the "registration" processing described above. Subsequently, the controller 8 reads out the sum signal of the card owner registered in the dictionary memory 7 and executes alignment between this sum signal and the sum signal calculated in step ST7 (step ST8). In step ST9, the controller 8 executes collation between the sum signal of the input finger image data and the sum signal registered in the dictionary memory 7. The "alignment" processing corrects for a deviation between the position of the finger obtained when the registration is performed as described above and that of the finger obtained when the finger image data is input in step ST6 (i.e., a deviation between the two sum signals). The "collation" is processing for numerically expressing the coincidence between the two sum signals obtained after the alignment.

Assume that the number of elements of each sum signal is N, the ith element of the sum signal read out from the dictionary memory 7 is Ad(i), and the ith element of the sum signal calculated in step ST7 is A(i). If the finger corresponding to the two sum signals is the same finger and the deviation between the two sum signals has a length of m pixels, the element Ad(i) of the sum signal read out from the dictionary memory 7 coincides with an element A(i+m) of the sum signal calculated in step ST7. In theory, therefore, a difference between Ad(i) and A(i+m) is "0". Therefore, when a value S(m) as a sum of squares of errors between the respective corresponding elements of the two sum signals, that is, $$S(m) = 1/(N-m) \sum_{i=1}^{N-m} \{A(i+m) - Ad(i)\}^2$$

for $m > 0$ or $$S(m) = 1/(N+m) \sum_{i=-m+1}^{N} \{A(i+m) - Ad(i)\}^2$$

for $m < 0$ is calculated, this value S(m) is theoretically "0". More specifically, S(m) is a parameter indicating the coincidence between the two sum signals, and the smaller the value S(m), the higher the coincidence. In this embodiment, m is changed within a predetermined range, the alignment is considered to be accomplished at a position corresponding to the value of m obtained when the value S(m) is smallest (assume that the value of m at this time is M), and the value of S(M) is taken as the result of collation.

When the alignment and the collation are completed, the controller 8 checks in accordance with the collation result S(M) whether the finger of the card owner, the image data of which is stored in the dictionary memory 7, coincides with the finger of the card user, the image data of which is input in step ST6 (step ST10). In this embodiment, a threshold value TH for checking the coincidence between two fingers is predetermined, and the determination of a coincidence/non-coincidence is executed in accordance with whether the value S(M) is larger than this threshold value. That is, a coincidence is determined if $S(M) \leq TH$, and a non-coincidence is determined if $S(M) > TH$.

Note that the registration, the alignment, and the collation of the finger characteristic data are described in detail in continuation U.S. Ser. No. 632,407 (filing date: Dec. 21, 1990) filed by the same assignee.

If the two fingers coincide with each other, the microprocessor 9 permits the use of the card (step ST11). If a non-coincidence is determined between the two fingers, the microprocessor 9 does not change the state of the IC card. Therefore, if a non-coincidence is determined, the card cannot be used. (A power ON state or a stand-by mode is kept.)

As described above, according to this embodiment, since determination of whether a user of a card is an owner of the card is executed in accordance with a parameter indicating a finger characteristic, an illegal use of a card can be prevented without forcing an owner of the card to remember his or her password. In particular, since a lateral wrinkle corresponding to a joint of a finger is used as the parameter indicating a finger characteristic, the size of the microsensors 1a of the pressure sensor 1 can be increased and the number of the microsensors 1a can be decreased compared to a method in that a fingerprint or the like is used as the parameter. Therefore, the arrangement of the pressure sensor 1 can be simplified, and the number of data (i.e., an amount of finger image data) output from the pressure sensor 1 can be decreased to simplify the subsequent processing. As a result, all the processing tasks for individual authentication can be easily performed by an integrated circuit incorporated in an IC card.

In addition, in this embodiment, since sum signals calculated from the finger image data are used to check whether a finger of a user of a card coincides with a finger of an owner of the card, the subsequent processing can be simplified. This advantage also makes it easy to execute all the processing tasks for individual authentication by the internal IC of the IC card. Note that the present invention i not limited to the above embodiment but can be applied to another system as long as the system uses the finger characteristic data.

Although an IC card is taken as an example of a card in the above embodiment, the present invention can be applied to a card called a radio card or a non-contact card.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An IC card with an individual authentication function, comprising:
   an IC card main body;
   memory means for storing reference finger characteristic data of a card owner;
   pressure sensing means, provided on one surface of the IC card main body, for measuring an applied finger pressure as measured finger characteristic data;
   collating means for collating the measured finger characteristic data with the reference finger characteristic data; and
   control means for permitting use of the IC card on the basis of a collation result of the collating means.

2. The IC card according to claim 1, wherein the collating means includes means for adding the finger characteristic data in a direction perpendicular to a length direction of the finger to produce a summation signal and means for performing collation between the measured and reference finger characteristic data using the summation signal from the adding means.

3. The IC card according to claim 1, wherein a length of the pressure sensor means is sufficient to measure the applied finger pressure including at least two joints of a finger as the measured finger characteristic data, and the collating means includes means for adding the finger characteristic data from the pressure sensing means in a direction perpendicular to a length direction of the finger.

4. An IC card comprising:
   an IC card main body;
   memory means for storing reference finger characteristic data of a card owner;
   pressure sensing means, provided on one surface of the IC card main body, for measuring an applied finger pressure as measured finger characteristic data;
   collating means for collating the measured finger characteristic data with the reference finger characteristic data;
   control means for permitting use of the IC card on the basis of a collation result of the collating means; and
   determining means for determining authenticity of a finger; wherein
   the control means limits the use of the IC card on the basis of a determination result of the determining means.

5. The IC card according to claim 4, wherein the pressure sensing means and the determining means are arranged in a position on which the finger is placed simultaneously.

6. The IC card according to claim 4, wherein the collating means includes means for adding the measured finger characteristic data in a direction perpendicular to a length direction of the finger to produce a summation signal, and means for performing collation between the measured reference finger characteristic data using the summation signal from said adding means.

7. The IC card according to claim 4, wherein a length of the pressure sensor means is sufficient to measure the applied finger pressure including at least two joints of á finger as the measured finger characteristic data, and the collating means includes means for adding the finger characteristic data from the pressure sensing means in a direction perpendicular to a length direction of the finger.

8. The IC card according to claim 4, wherein the control means includes means for inhibiting a collation result from being output, when the determination result of the determining means indicates "fake".

9. A portable medium comprising:
memory means for storing reference finger characteristic data of a owner of the portable medium;
pressure sensing means provided on a surface of the portable medium and comprised of a plurality of sensing materials for sensing an applied pressure of surface undulations of a finger being depressed on the pressure sensing means, the sensed pressure being output as measured finger characteristic data;
collating means for collating the measured finger characteristic data with the reference finger characteristic data;
control means for permitting use of the portable medium on the basis of a collation result of the collating means; and
determining means for determining authenticity of the depressed finger; wherein
the control means limits the use of the portable medium on the basis of a determination result of the determining means.

10. The portable medium according to claim 9, wherein the pressure sensing means and the determined means are arranged in a position on which a depressed finger is placed simultaneously.

11. The portable medium according to claim 9, wherein the collating means includes means for adding the finger characteristic data in a direction perpendicular to a length direction of the finger to produce a summation signal, and means for performing collation between the measured and reference finger characteristic data using the summation signal from the adding means.

12. The portable medium according to claim 9, wherein a length of the pressure sensor means is sufficient to measure the applied finger pressure including at least two joints of a finger as the measured finger characteristic data, and the collating means includes means for adding the finger characteristic data from the pressure sensing means in a direction perpendicular to a length direction of the finger.

13. The portable medium according to claim 9, wherein said control means includes means for inhibiting a collation result from being output, when the determination result of the determining means indicates "fake".

14. An IC card with an individual authentication function, comprising:
an IC card main body;
memory means for storing reference finger characteristic data of a card owner;
pressure sensing means comprised of a plurality of pressure sensing elements arranged in a matrix fashion on one surface of the IC card main body, each sensing element being turned on when depressed by a pressure greater than or equal to a predetermined pressure, said pressure sensing means for inputting, as pressure, finger characteristic data;
collating means for collating the finger characteristic data input from the pressure sensing means with the finger characteristic data of the card owner stored in the memory means; and
control means for permitting use of the IC card on the basis of a collation result of the collating means.

15. An IC card comprising:
an IC card main body;
memory means for storing finger characteristic data of a card owner;
pressure sensing means comprised of a plurality of pressure sensing elements arranged in a matrix fashion on one surface of the IC card main body, each sensing element being turned on when depressed by a pressure greater than or equal to a predetermined pressure, said pressure sensing means for inputting, as pressure, finger characteristic data;
collating means for collating the finger characteristic data input from the pressure sending means with the finger characteristic data of the card owner stored in the memory means;
determining means for detecting a reflected light amount from the finger over a time change of finger depression to determine authenticity of a finger; and
control means for permitting use of the IC card on the basis of a collation result of the collating means.

16. A portable medium comprising:
memory means for storing finger characteristic data of a owner of the portable medium;
pressure sensing means provided on a surface of the portable medium and comprised of a plurality of sensing materials, arranged in a matrix fashion, the sensing materials being turned on when a pressure greater than or equal to a predetermined pressure is applied to the sensing materials, said pressure sensing means for sensing finger characteristic data as applied pressure of surface undulations of a finger being depressed;
collating means for collating the finger characteristic data input from the pressure sensing means with the finger characteristic data of the owner stored in the memory means;
determining means for detecting a reflected light amount from the finger over a time change of finger depression to determine authenticity of a finger; and
control means for permitting use of the portable medium on the basis of a collation result of the collating means.

* * * * *